(12) United States Patent
Mariller

(10) Patent No.: US 9,663,288 B2
(45) Date of Patent: May 30, 2017

(54) POUCH FOR PREPARING A BEVERAGE

(75) Inventor: Alain Mariller, Le Mont-Pèlerin (CH)

(73) Assignee: PSR PROFITABLE STRATEGIC REDEPLOYMENT SÀRL, Fribourg (CH)

( * ) Notice: Subject to any disclaimer, the term of this patent is extended or adjusted under 35 U.S.C. 154(b) by 286 days.

(21) Appl. No.: 13/393,362

(22) PCT Filed: Aug. 19, 2010

(86) PCT No.: PCT/IB2010/053742
§ 371 (c)(1),
(2), (4) Date: Apr. 5, 2012

(87) PCT Pub. No.: WO2011/024103
PCT Pub. Date: Mar. 3, 2011

(65) Prior Publication Data
US 2012/0210879 A1    Aug. 23, 2012

(30) Foreign Application Priority Data

Aug. 29, 2009  (WO) .................. PCT/IB2009/053778

(51) Int. Cl.
*A47J 31/00* (2006.01)
*B65D 85/804* (2006.01)
*A47J 31/36* (2006.01)

(52) U.S. Cl.
CPC ...... *B65D 85/8043* (2013.01); *A47J 31/3666* (2013.01); *A47J 31/3676* (2013.01)

(58) Field of Classification Search
CPC .............. B65D 85/8043; B65D 85/804; A47J 31/3695; A47J 31/3676; A47J 31/3666

USPC ........................................ 99/295, 302 R, 323
See application file for complete search history.

(56) References Cited

U.S. PATENT DOCUMENTS

| | | | |
|---|---|---|---|
| 723,287 A | | 3/1903 | Lawson et al. |
| 4,471,689 A | * | 9/1984 | Piana ............................. 99/295 |
| 5,240,722 A | | 8/1993 | Louridas |
| 6,347,725 B1 | | 2/2002 | Yoakim et al. |
| 7,335,387 B2 | * | 2/2008 | Hayes et al. .................. 426/433 |
| 7,836,819 B2 | * | 11/2010 | Suggi Liverani et al. ..... 99/295 |
| 8,409,646 B2 | * | 4/2013 | Yoakim et al. ............... 426/115 |
| 2001/0048957 A1 | | 12/2001 | Lazaris et al. |
| 2003/0159589 A1 | * | 8/2003 | Meador ........................... 99/295 |
| 2009/0101651 A1 | | 4/2009 | Rasmussen et al. |

FOREIGN PATENT DOCUMENTS

| | | |
|---|---|---|
| EP | 0 145 499 | 4/1989 |
| EP | 0 455 337 | 11/1991 |
| EP | 0 638 486 | 2/1995 |

(Continued)

OTHER PUBLICATIONS

International Search Report for PCT/IB2010/053742, mailed Dec. 9, 2010.

(Continued)

*Primary Examiner* — Reginald L Alexander
(74) *Attorney, Agent, or Firm* — Nixon & Vanderhye P.C.

(57) ABSTRACT

The invention relates to a pouch for preparing a beverage such as coffee, including a space intended to contain a concentrated dose, for example of ground coffee, and an inlet opening and an outlet opening, both of which are communicated with the space.

25 Claims, 3 Drawing Sheets

(56) References Cited

FOREIGN PATENT DOCUMENTS

| | | |
|---|---|---|
| EP | 1 101 430 | 5/2001 |
| EP | 1 274 332 | 6/2004 |
| EP | 1 440 904 | 7/2004 |
| EP | 1 774 878 | 4/2007 |
| GB | 1 256 247 | 12/1971 |
| GB | 2 123 685 | 2/1984 |
| WO | 99/05044 | 2/1999 |
| WO | WO 99/05036 | 2/1999 |
| WO | WO 99/05044 | 2/1999 |
| WO | 2008/148601 | 12/2008 |
| WO | 2008/148650 | 12/2008 |

OTHER PUBLICATIONS

Written Opinion of the International Searching Authority for PCT/IB2010/053742, mailed Dec. 9, 2010.

\* cited by examiner

Fig 3-a

POUCH FOR PREPARING A BEVERAGE

This application is the U.S. national phase of International Application No. PCT/IB2010/053742, filed 19 Aug. 2010, which designated the U.S. and claims priority to International Application No. PCT/IB2009/053778, filed 29 Aug. 2009, the entire contents of each of which are hereby incorporated by reference.

FIELD OF THE INVENTION

The invention concerns the preparation of beverages, for example coffee, by introduction of water into an element containing a concentrated dose, for example of ground coffee, and by extraction of the mixture thus obtained.

PRIOR ART

Various types of element are known containing a concentrated dose through which water is introduced, mixed with the concentrated dose, then extracted from the element.

The element takes the form of a capsule or pouch, for example.

The introduction of water into the element is effected by piercing at least one wall of the element. The extraction may be effected by piercing, tearing or bursting a wall of the element.

GENERAL STATEMENT OF THE INVENTION

One of the objectives of the invention consists in offering an element for the preparation of a beverage that does not have to be pierced, torn or burst on introduction and/or extraction of liquid.

In the invention, this objective is effected by means of a pouch comprising a space intended to contain a concentrated dose, an inlet opening and an outlet opening, both communicating with said space.

In a first embodiment of the invention the two openings are disposed in the vicinity of each other.

The pouch preferably comprises a tubular element formed of two ends, the first being connected to one of the openings, the other being disposed in said space, at a location distant from the other opening, in such a manner that the water-dose mixture is optimal.

The tubular element is advantageously connected to the inlet opening.

In a variant, the tubular element is formed from a strip, constituted for example of the same material as that which constitutes the walls of the pouch, the edges of which are stuck to one of the internal faces of the pouch.

The pouch is preferably adapted to be disposed vertically in active mode. This arrangement offers the possibility to benefit from the gravitation force that drives the liquid towards the bottom of the pouch. This advantage being particularly useful when the two openings are disposed in the upper part of the pouch.

According to another variant, the pouch comprises a rigid part adapted to be fixed to an extraction device. In this configuration, the rigid part may include the openings.

Note here the rigid part need not necessarily be rigid. This embodiment is nevertheless preferred because it ensures better stability and fixing of the pouch when the latter is in the device.

The walls of the pouch may be flexible, semi-rigid or entirely rigid.

The invention also concerns a device for the extraction of a beverage adapted to use a pouch as defined above.

In one variant the device includes two water inlet pipes disposed in such a manner as to connect two opposite faces of the pouch. This embodiment has the advantage allowing insertion of the pouch in the device either way round.

BRIEF DESCRIPTION OF THE DRAWINGS

FIG. 3a is sectional plan view of the rigid part of the pouch showing interaction with the nozzles of the extraction device;

DETAILED EXPLANATION OF THE INVENTION

Figure 1:
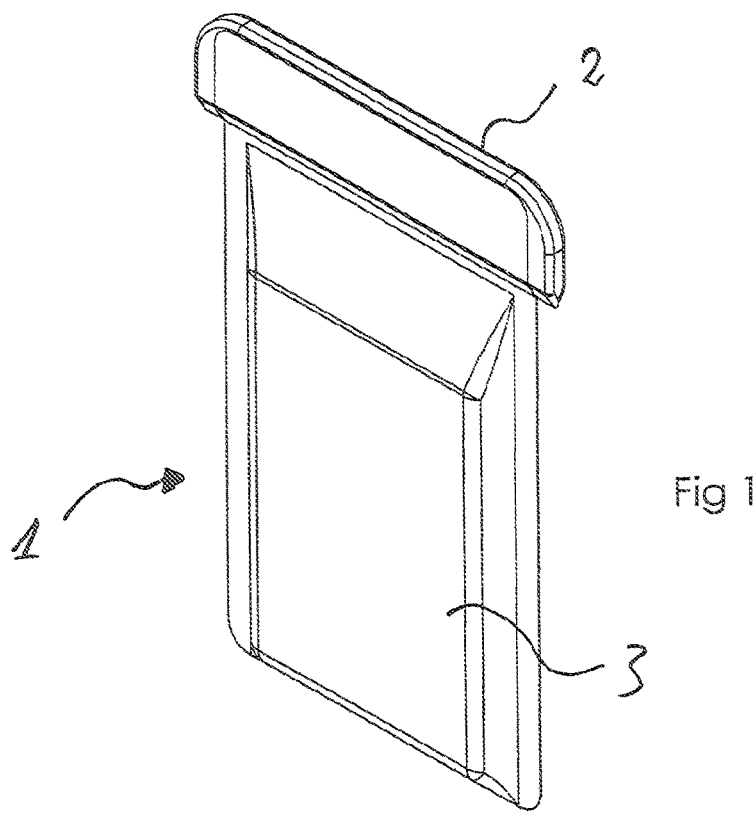
FIG. 1 is a perspective view showing a pouch for preparing a beverage in accordance with an embodiment of the invention.

The invention is described in more detail hereinafter by means of examples illustrated by the following figures:

FIG. 1 shows a complete pouch 1, with walls of flexible, semi-rigid or rigid material, that is constituted of two main parts, i.e. a rigid part 2 and a pouch 3. In this example, the rigid part 2 being specially designed to provide a novel way to inject hot water (the pouch may contain coffee or other powder products to be extracted or dissolved).

A pouch 3, which contains a concentrated dose, in NatureFlex or any other flexible or rigid material, biodegradable or otherwise, may be used.

Figure 2:
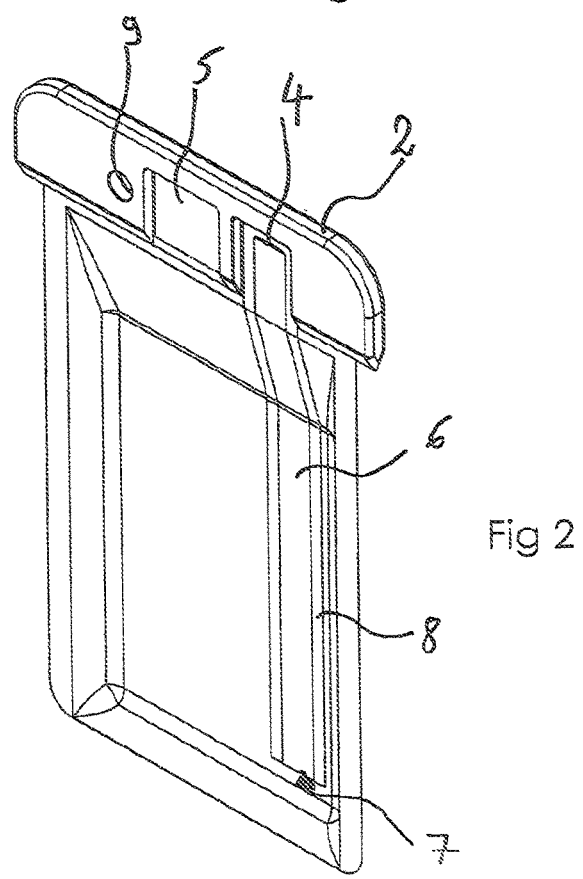
FIG. 2 is a perspective sectional view of the pouch shown in FIG. 1.

FIG. 2 shows a vertical section of the pouch from FIG. 1. The right-hand part serves to inject water via an inlet opening 4 and to channel it into a tubular element 6 to send it into the lower part of the pouch. This channel 6 is preferably constituted by simple welding of a strip constituted of the same material as the walls of the pouch 3, for example NatureFlex, so that the water is conducted toward the bottom of the dose without being able to escape before reaching the bottom. In this situation, the edges of the strip are stuck to the internal face of the pouch 3.

Water is injected at the level of the rigid part 2, itself welded horizontally to the pouch 3 to force the water toward the only possible part which, in the example illustrated, is downward. Any other solution utilizing the same principle of forcing the water toward a location distant from the inlet opening, for example by means of a pipe, is obviously possible in the context of the present invention.

In this embodiment, the tubular element 6 is thus rigidly fastened to the rigid part 2.

Note that the tubular element 6 may be disposed in a different manner in the pouch 3, for example transversely, in a Z-shape or spiral shape, or in any other manner enabling optimum mixing of the water with the concentrated dose. It is also possible to connect the tubular element 6 to the outlet opening 5, or even to connect each opening 4, 5 to a tubular element. The tubular element 6 may also include small holes along its length, which would induce pre-wetting of the dose, prior to mixing.

Figure 3:
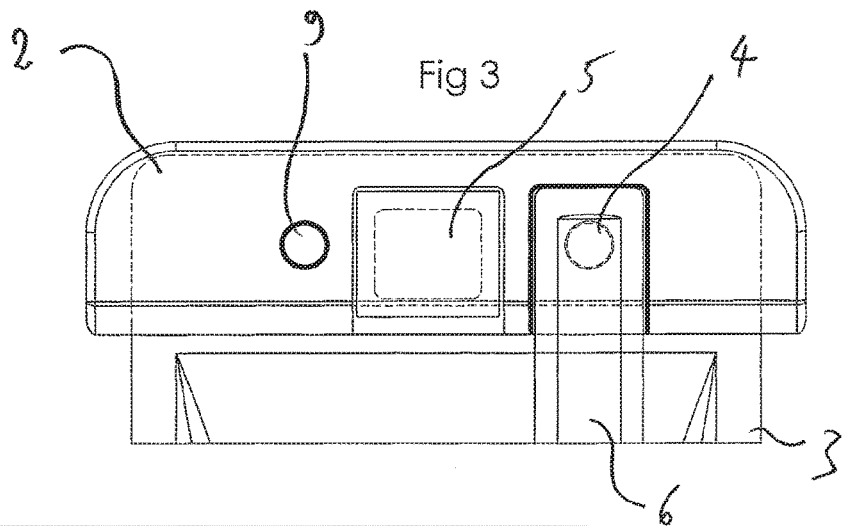
FIG. 3 is a sectional elevational view of the rigid part of the pouch.

FIG. 3 is a section showing the details of the rigid part 2. Water is injected into the right-hand portion of the rigid part, for example by means of a nozzle or any other appropriate mechanism, from the face that is hidden in this figure.

Also seen—almost at the center—is the outlet opening 5, where the water-dose mixture emerges via a filter element that prevents the powder contained in the dose from escaping but allows the liquid extracted or charged with soluble material to pass through.

The round hole 9 to the left of the outlet opening 5 enables the pouch 1 to be inserted into the extraction device ED either way round (see FIG. 3a). The hole 9 does not pass completely through the rigid part 2 but is constituted of an opening that stops half-way along in the form of a flat wall (blind hole).

FIG. 3a shows the extraction device ED with two nozzles 10, 11 (fed by two jaws not shown). In this example, the insertion of the pouch 1 has the effect of connecting the right-hand nozzle 11 with the inlet opening 4, the other nozzle 10 encountering the hollowed out hole 9. The nozzles 10, 11 are provided with a seal preventing water from escaping from the hollowed out hole 9 that the nozzle 10 that does not inject water does not enter anyway, but its cooperation with the rigid part 2 prevents accidental flow at this location, thus forcing all the pressure and all the flow of water via the active nozzle 11.

Note in FIG. 3a the nozzle 11 that injects/works, as well as the O-ring seal 12 that obliges water to enter the tubular element 6 that is directed downward.

In the same figure, there is seen on the left the nozzle 10 that is pressed into the hollowed out hole 9 and where the O-ring seal 13 prevents water flowing.

The two nozzles 10, 11 are of course connected to the same pipe feeding hot water under pressure and the effect of communicating vessels ensures that all the flow passes through the right-hand nozzle 11.

Figure 4:
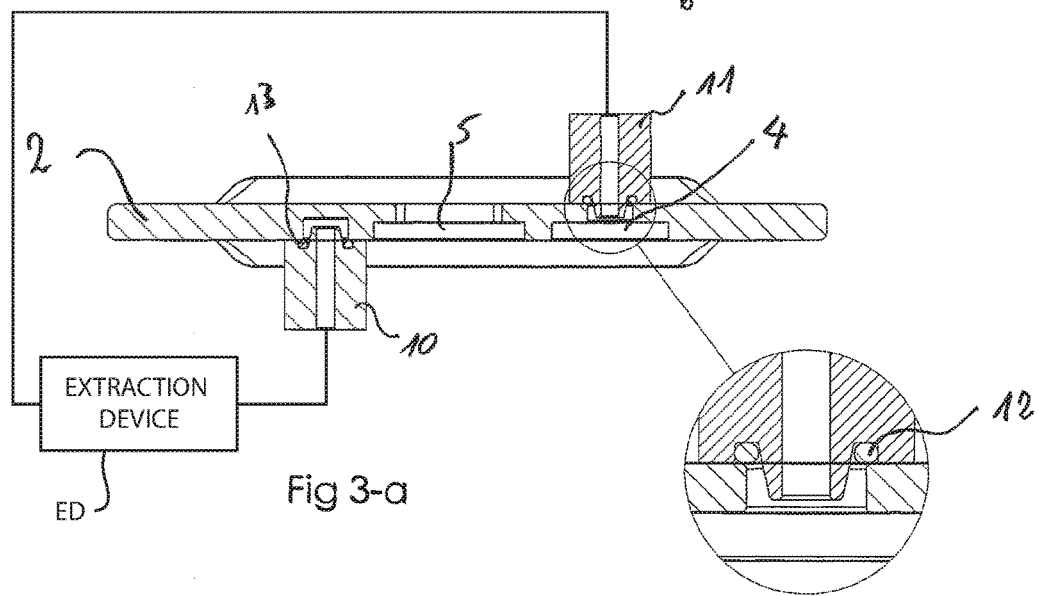
FIG. 4 is an elevational semi-transparent view of the back face of the rigid part of the pouch.
Figure 4:
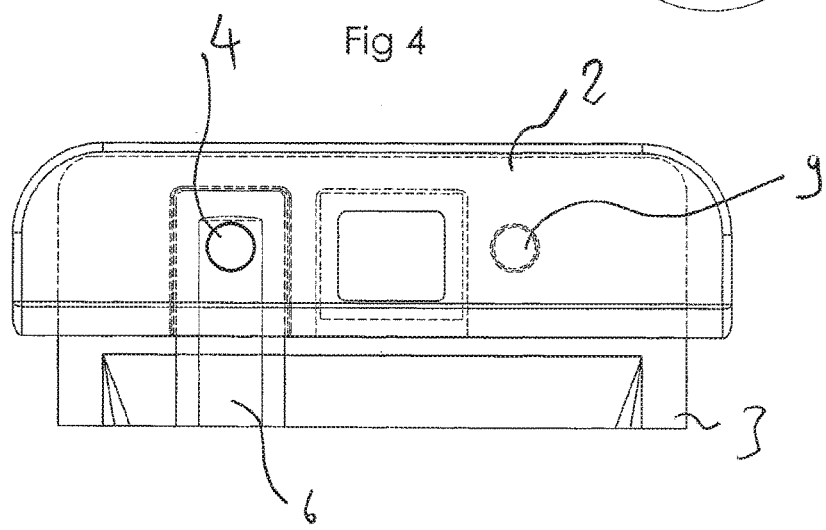

FIG. 4 represents the other face of the rigid part 2, in semi-transparent view, where there is seen on the right-hand side of the figure the hollowed out hole 9. Also seen on the left is the inlet opening 4. Note further in the middle the outlet opening 5 including a filter, the latter being disposed on only one side of the rigid part 2.

The means of recovering the water-dose mixture at the outlet 5 of the pouch are not shown. Any appropriate system may be envisaged, for example a pipe terminating farther along toward a cup, buffer container, etc.

Figure 5:
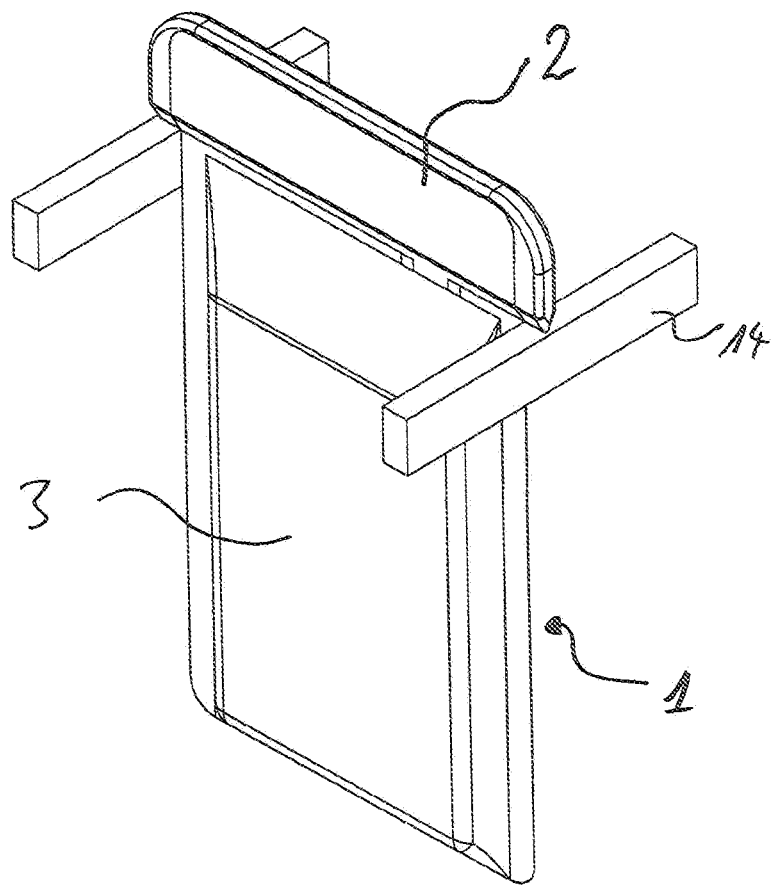
FIG. 5 is a diagrammatic representation of the manner in which the pouch is placed on a support before closing the jaws of the extraction device.

FIG. 5 represents in a highly diagrammatic manner a pouch 1 of the invention placed on a support 14 before closing of the jaws, themselves intended to wedge the dose and introduce the nozzles 10, 11.

The invention claimed is:

1. A pouch for preparing a beverage comprising:
   a rigid part,
   a flexible or semi-rigid part formed of a flexible or semi-rigid material, wherein the flexible or semi-rigid part defines a space which is intended to contain a concentrated dose of the beverage so the beverage is capable of being brewed in the space,
   an inlet opening for injection of water under pressure and an outlet opening for extraction of the beverage, disposed in the rigid part, wherein both the inlet opening and the outlet opening communicate with the space defined by the flexible or semi-rigid part and are disposed in the vicinity of each other.

2. The pouch according to claim 1, wherein the tubular element is connected to the inlet opening.

3. The pouch according to claim 1, wherein the pouch is adapted to be disposed vertically in a device for the extraction of the beverage.

4. The pouch according to claim 1, further comprising a rigid part adapted to be fixed to an extraction device.

5. The pouch according to claim 4, wherein the rigid part includes the inlet and outlet openings.

6. A device for the extraction of a beverage adapted to use a pouch as defined in claim 1.

7. The device according to claim 6, comprising two water inlet pipes disposed in such a manner as to be connected to two opposite faces of the pouch.

8. The pouch according to claim 1, wherein the beverage is coffee, and wherein the concentrated dose of the beverage is ground coffee.

9. The pouch according to claim 1, further comprising a tubular element having two ends, a first one of said two ends being connected to one of said inlet and outlet openings and a second one of said two ends being disposed in said space at a location distant from the other of the inlet and outlet openings.

10. A pouch for preparing a beverage comprising:
    a rigid part,
    a flexible or semi-rigid part formed of a flexible or semi-rigid material, wherein the flexible or semi-rigid part defines a space which is intended to contain a concentrated dose of the beverage so that the beverage is capable of being brewed in the space,
    inlet and outlet openings disposed in the rigid part in the vicinity of each other, wherein both the inlet opening and the outlet opening communicate with the space for injection of water under pressure into the space and extraction of the beverage from the space, respectively.

11. The pouch according to claim 10 wherein the tubular element is connected to the inlet opening.

12. The pouch according to claim 10 adapted to be disposed vertically in a device for the extraction of a beverage.

13. The pouch according to claim 10 comprising a rigid part adapted to be fixed to an extraction device.

14. The pouch according to claim 13 wherein the rigid part includes the openings.

15. A device for the extraction of a beverage adapted to use a pouch as defined in claim 10.

16. The device according to claim 15 comprising two water inlet pipes disposed in such a manner as to be connected to two opposite faces of the pouch.

17. The device according to claim 10, wherein the beverage is coffee, and wherein the concentrated dose of the beverage is ground coffee.

18. A device for the extraction of a beverage adapted to use a beverage preparation pouch, wherein the device comprises two water inlet pipes disposed in such a manner as to be connected to two opposite faces of the pouch, wherein the pouch comprises:
    a top end and a bottom end,
    a rigid part,
    a flexible or semi-rigid part formed of a flexible or semi-rigid material, wherein the flexible or semi-rigid part defines a space between the top end and the bottom end for containing a concentrated dose of a beverage making product to allow the beverage to be brewed in the space,
    an inlet opening disposed in the rigid part, and
    an outlet opening which is separate from and positioned next to the inlet opening, wherein the inlet opening and the outlet opening each communicate with the space for injection of water under pressure into the space and extraction of the beverage from the space, respectively.

19. The device according to claim 18, wherein the pouch comprises a tubular element formed of a first end and a second end, the first end being connected to one of the inlet and outlet openings, and the second end being disposed in said space and at a location distant from the other of the inlet and outlet openings.

20. The device according to claim 19, wherein the pouch's tubular element is connected to the inlet opening.

21. The device according to claim 18, wherein the pouch is adapted to be disposed vertically in the device for the extraction of a beverage.

22. The device according to claim 18, wherein the rigid part is adapted to be fixed to the device.

23. The device according to claim 22, wherein the rigid part of the pouch includes both the inlet and outlet openings.

24. The pouch according to claim 1 or 10, wherein the inlet and outlet openings are positioned in an upper part of the pouch.

25. The pouch according to claim 24, further comprising a tubular element having two ends, a first one of said two ends being connected to one of said inlet and outlet openings and a second one of said two ends being disposed in said space at a location distant from the other of the inlet and outlet openings.

* * * * *